United States Patent
Moran

(10) Patent No.: US 6,763,618 B1
(45) Date of Patent: Jul. 20, 2004

(54) COMBINATION RAKE AND GRUBBER IMPLEMENT

(76) Inventor: Daniel Edward Moran, 2700 S. Bridge St., Brady, TX (US) 76825

(\*) Notice: Subject to any disclaimer, the term of this patent is extended or adjusted under 35 U.S.C. 154(b) by 0 days.

(21) Appl. No.: 10/385,363

(22) Filed: Mar. 11, 2003

(51) Int. Cl.$^7$ .................................................. A01B 13/00
(52) U.S. Cl. ....................................... 37/301; 172/817
(58) Field of Search .................... 37/403, 405, 406, 37/468, 301, 302, 303; 172/810, 811, 817

(56) References Cited

U.S. PATENT DOCUMENTS

| | | | | |
|---|---|---|---|---|
| 2,322,115 A | * | 6/1943 | Cox et al. | 172/834 |
| 2,491,208 A | | 12/1949 | Price | |
| 2,632,261 A | * | 3/1953 | Ferris, Jr. | 37/301 |
| 2,705,082 A | * | 3/1955 | Heimsoth | 414/685 |
| 2,882,622 A | | 4/1959 | Howard | |
| 3,111,777 A | * | 11/1963 | Prater | 37/405 |
| 3,195,247 A | * | 7/1965 | Grimes | 37/301 |
| 3,595,416 A | * | 7/1971 | Perrotti | 414/704 |
| 3,835,932 A | | 9/1974 | Mitchell | |
| 3,858,338 A | * | 1/1975 | Queiroz | 37/301 |
| 3,967,397 A | * | 7/1976 | Nault | 37/405 |
| 4,327,509 A | * | 5/1982 | Bean | 37/404 |
| 4,356,644 A | | 11/1982 | Harkness | |
| 4,364,191 A | * | 12/1982 | Cazes | 37/301 |
| 4,372,063 A | * | 2/1983 | Work | 37/301 |
| 4,407,080 A | | 10/1983 | Mann | |
| 4,517,755 A | * | 5/1985 | Nicholson | 37/404 |
| 4,779,363 A | * | 10/1988 | Boutrais et al. | 37/405 |
| 4,808,062 A | * | 2/1989 | Bare | 414/703 |
| 4,907,356 A | * | 3/1990 | Labounty | 37/406 |
| 5,490,340 A | | 2/1996 | Muncy | |
| 5,544,435 A | * | 8/1996 | Somero | 37/405 |
| 5,797,461 A | * | 8/1998 | Noble | 172/200 |
| 6,564,836 B2 | * | 5/2003 | Cook | 144/334 |

\* cited by examiner

Primary Examiner—Victor Batson
(74) Attorney, Agent, or Firm—Jackson Walker L.L.P.; David Allen Hall; Richard R. Ruble

(57) ABSTRACT

A combination rake and grubber implement mounted on a work vehicle such as a tractor or bulldozer has four main members: a lower, open or partially-closed multi-toothed rake; an upper rake that can gather, according to design and porosity, various rake products; grubbers that may be deployed, while the vehicle is moving or stationary, anywhere in an arc perpendicular to the rake plane ranging from below the bottom of the rake to above the rake; and a linkage that when actuated by some mechanical, electrical, or pneumatic force, moves the grubbers through their range of motion. In operation the grubbers bring rocks, debris, and severed roots to the surface for simultaneous raking along with undesirable surface rocks, debris, and vegetation. During operation, the vehicle operator may independently control the rake and grubber positions with respect to each other and with respect to the ground without having to dismount.

12 Claims, 3 Drawing Sheets

COMBINATION RAKE AND GRUBBER IMPLEMENT

FIELD OF INVENTION

The present invention relates generally to the field of implements for farm, ranch, landscaping, and earth moving equipment. More specifically, the present invention relates to the field of implements for a tractor, bulldozer, skid-loader, or any powered vehicle, where the implement is used as a combination rake and grubber. A grubber is a digging tool used for ripping soil and ground cover, cutting unwanted vegetative roots and debris, and dislodging rocks. A rake is a tool used to gather surface and grubbed material into a pile called "rake product."

BACKGROUND OF THE INVENTION

The field related to ripping soil and grubbing is rich with disclosure. Howard (U.S. Pat. No. 2,882,622) discloses a single tool that, when attached behind a bulldozer blade, can be manually moved vertically in a direction perpendicular to the ground to an upper, inoperative position, or to an operative position lower than the blade. When the bulldozer moves forward with the grubber in the lower position, the grubber rips into the ground and, at a preset depth, severs vegetative roots. In a separate subsequent operation with the grubber raised to its inoperative position and the blade lowered to grade level, the bulldozer can scrape or rake the grubbed area.

Harkness (U.S. Pat. No. 4,356,644) discloses a grubber that is mounted on the back of a tractor. The grubber can be hydraulically raised and lowered without need for the operator to dismount the tractor. However, the Harkness grubber requires the operator to back the tractor close to the individual tree or bush to be removed, lower the grubber to the ground, back the tractor further until the grubber blade contacts the roots below the ground, stop the tractor, and then operate the grubber hydraulics to dislodge the roots. Harkness discloses no raking feature.

Price (U.S. Pat. No. 2,491,208) discloses a one-piece multi-toothed rake and grubber combination mounted on the front of a bulldozer or similar vehicle. There is no relative rake and grubber displacement.

Mitchell (U.S. Pat. No. 3,835,932) discloses a combination scarifier and pulverizer for use with earth moving equipment. The scarifier consists of multiple teeth attached to the lower edge of a horizontal transverse member that is removably attached to the bulldozer member arms that support the typical bulldozer earth moving blade. When the vehicle moves forward, the scarifier teeth rip the ground to a depth determined by the adjustable vertical position of the bulldozer blade arms. Plates welded to the scarifier member pulverize the scarified earth as the earth moving vehicle moves forward. The scarified and pulverized material eventually passes between the scarifier teeth and under the pulverizer plates, and no raking function is performed. Although Mitchell provides relative vertical positioning between the scarifier teeth and the pulverizer plates, the teeth must be individually and manually positioned while the vehicle is stopped.

Mann (U.S. Pat. No. 4,407,080) discloses a frame that is hinged to the top of a bulldozer blade. To the frame member parallel to and opposite from the hinged frame member are attached several teeth designed to rip the earth when the hinged frame is deployed in the down position and the bulldozer moves forward. Subsequent to the grubbing procedure, the bulldozer can perform a scraping or raking function by moving in the reverse direction with the blade lowered. During the reverse-motion scraping or raking operation the hinged, toothed frame pivots upward, thus relieving the teeth of potentially destructive forces. The Mann device offers no relative displacement between the row of teeth and the bottom of the bulldozer blade during the ripping operation. The ripping teeth are either deployed in their operative downward position, or pivoted and secured in the nondeployed, upward position. Changing the position of the toothed frame is a manual operation possible only when the bulldozer is stationary.

SUMMARY OF THE INVENTION

Applicant enhances the field of implements for farm, ranch, landscaping, and earth moving equipment with his invention of a combination rake and grubber that eliminates the major shortcomings of the currently available implements. Applicant's invention decreases the time, fuel, and manpower required for clearing land of unwanted rocks, debris, and vegetation. With the disclosed apparatus an operator is able to simultaneously but independently vary the depth of the grubber cut and the height above grade level of the rake. He is able to make such adjustments during the process of clearing land. There is no need to interrupt the work by stopping the work vehicle and dismounting to make a manual adjustment. Such versatility enables the operator to clear land faster than is possible with current grubber implements. Also, the clearing is more precise because the grubber depth and rake height can be varied in response to varying terrain contours, composition, vegetation, and debris.

For example, if in the course of clearing land the operator encounters patches of dense cactus with interspersed mesquite groves, and then encounters a treeless area that must be cleared of debris such as abandoned buried water pipe, he is able to vary the grubber-rake relative position as the job dictates. He does not lose time by stopping work to make equipment adjustments, and he does not have to traverse the same ground twice, once to grub and again to rake.

Every manual operation involving loading, unloading, moving, changing, or adjusting heavy equipment creates potential for fatigue and injury. By decreasing the number of separate implements that must be moved from one work site to another, eliminating the need to manually change between separate grubber and rake implements, and by providing for machine controlled grubber/rake adjustments, Applicant's invention improves safety.

A combination rake and grubber implement mounted on a work vehicle such as a tractor, skid-loader, or bulldozer has four main members: (1) a lower rake having several fixed or removable teeth that are separated by open spaces or spaces that are partially closed by a solid or porous plate attached to some part of some or all of the teeth; (2) an upper rake that extends generally upward from and is hinged or rigidly attached to the lower rake, is the same or approximately the same width as the lower rake, is solid or porous, and can gather selected rake product according to design, angle of orientation, and porosity; (3) a grubber or set of grubbers attached to the rake or the vehicle so that the grubbers may be deployed, while the vehicle is moving or stationary, anywhere in an arc perpendicular to the rake plane ranging from below the bottom of the rake to above the rake; and (4) a linkage that when actuated, moves the grubbers through their range of motion. During forward motion of the work vehicle the grubbers can cut surface and subsurface roots and debris, unearth rocks, and bring the grubbed product to the surface where it is caught and raked by the rake portions of Applicant's invention.

Depending on the selected porosity of the toothed, lower portion of the rake, dirt and small pieces of vegetation and rock may flow through the rake or may be caught. As the raked vegetation, debris, and rocks are rolled and piled in front of the rake, the size of product caught by the upper portion of the rake is determined by its design and porosity. For example, Applicant's rake can be manufactured in a single vertical plane, or it can be made of three vertical planes, the two end planes angled forward so as to better capture rake product by restraining its tendency to roll off the ends of the rake and out of the raked pile.

DETAILED DESCRIPTION OF THE PREFERRED EMBODIMENT

Figure 1:
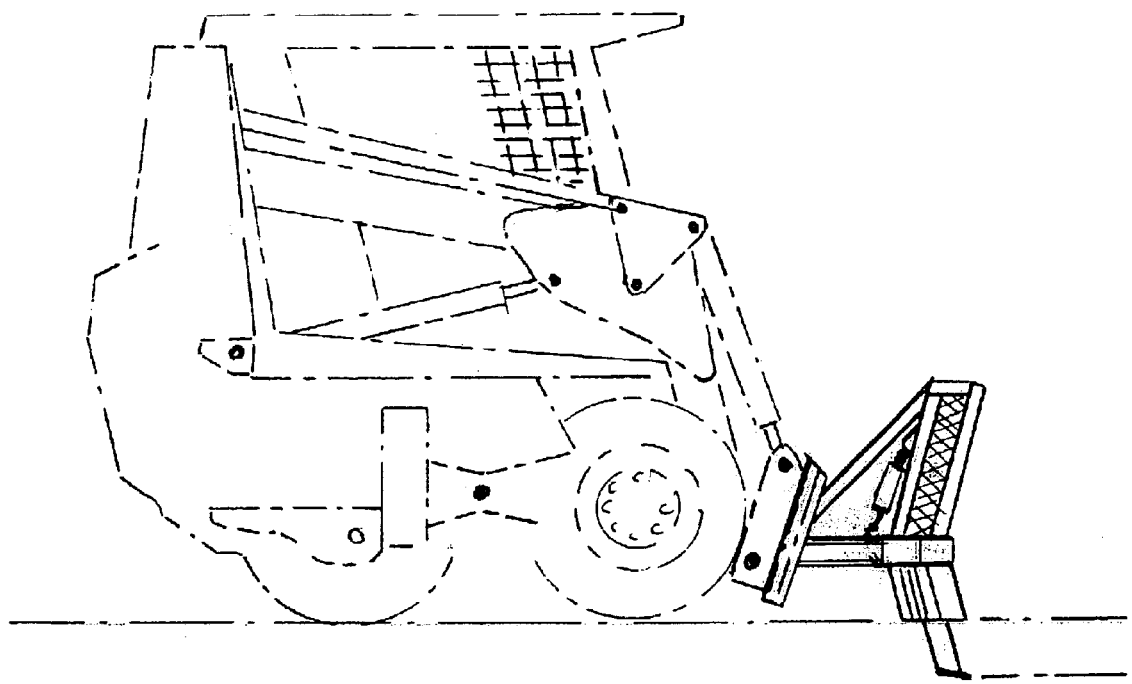
FIG. 1 and FIG. 2 show one embodiment of Applicant's invention attached to a skid-loader with a single grubber located near the center of the rake. The grubber is constructed of two blades, a foot, and a lateral support member. The rake as shown is constructed of welded tubular and sheet steel and expanded metal. The spaces between the rake teeth are completely open. The top view of FIG. 2 shows a rake configuration having approximately 24 inches (61 cm.) of both ends of the rack angled approximately 15 degrees toward the rake front.

FIG. 1 illustrates one embodiment of Applicants' novel rake and grubber implement that is provided for attachment to motorized wheeled or track farm, ranch, landscaping, and earth moving vehicles. The overall dimensions of Applicant's implement are determined in part by the size and power of the vehicle to which it will be attached, and by the demands of the job to be performed. The FIG. 1 rake embodiment is approximately 4.5 ft. (137 cm) high and 8 ft. (244 cm) wide.

Figure 2:
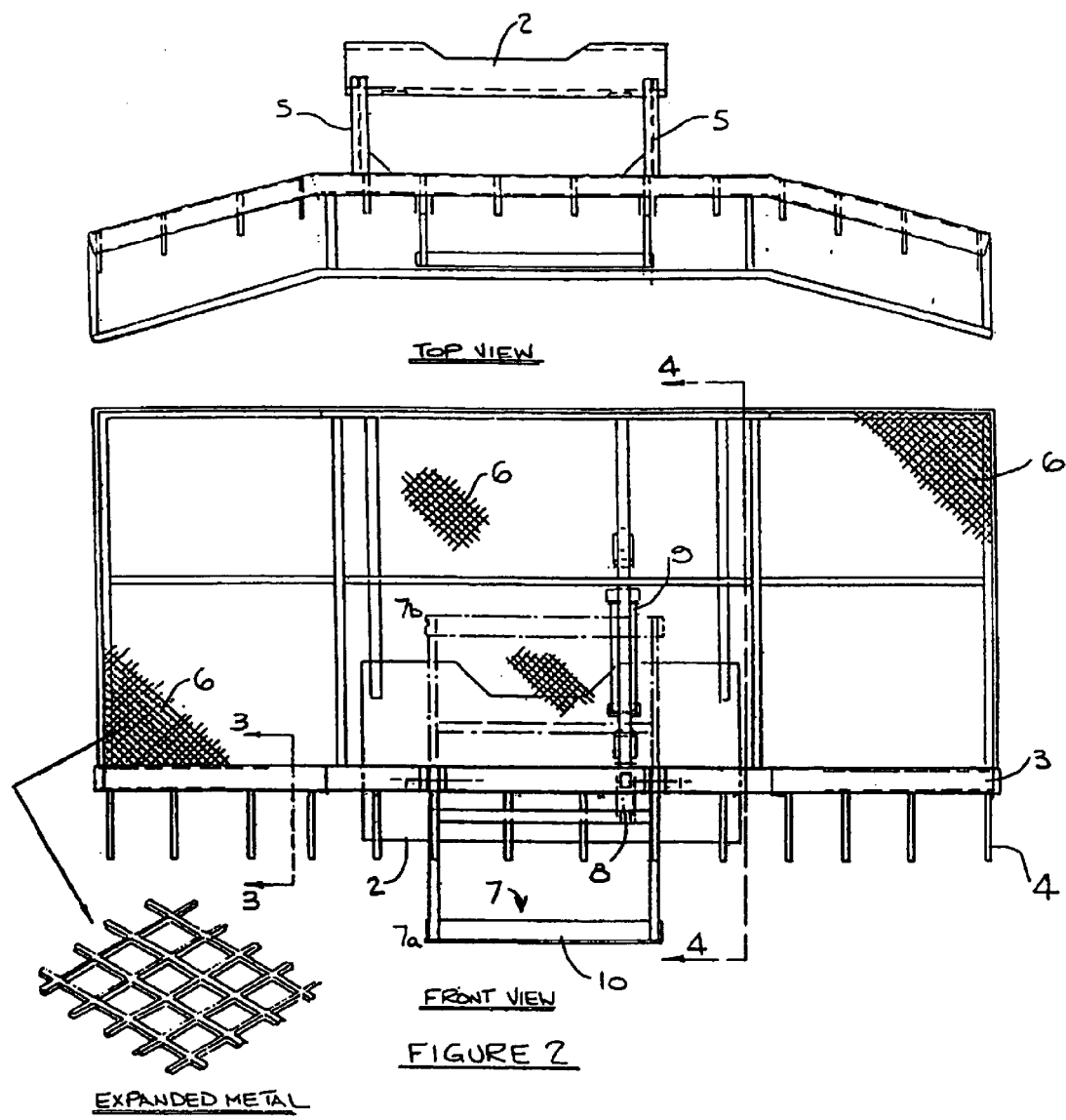
Figure 3:
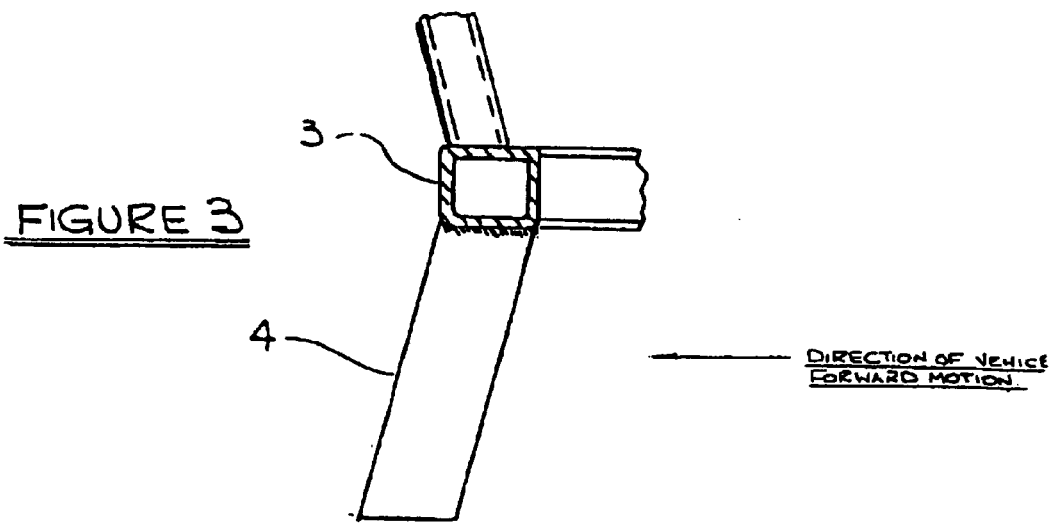
FIG. 3 is a sectional view of the rake teeth.

The FIG. 2 embodiment has a framework of welded steel members, member 2 of which attaches to a work vehicle's yoke member that typically serves as the attachment and maneuvering member for front-mounted loaders and blades. The illustrated embodiment includes two rectangular sections, the upper and lower rakes, rigidly attached to the top and bottom, respectively, of a substantially horizontal member 3. In another embodiment the upper and lower rakes could be rotatably attached or hinged to member 3. The lower rake has several teeth 4 constructed of plates welded to member 3. In another embodiment the teeth could be removable. The illustrated teeth 4 are parallel to each other, approximately equally spaced, and positioned so that their lower extremities are slightly forward (in the direction of operational forward motion) of member 3. The spaces between the teeth are completely open. When the implement is vertically positioned such that the bottom edges of teeth 4 are approximately at grade level, they are substantially parallel to the ground.

The upper rake section of the FIG. 2 embodiment is constructed of welded tubular and plate steel welded to member 3, reinforced and partially supported by members 5, and covered with a face 6 of expanded metal. The upper rake of FIG. 2 angles slightly forward of vertical such that the angle formed by the upper and lower rake planes is the angle approximately subtended by the grubber range of motion, and is approximately 150 degrees.

Figure 4:
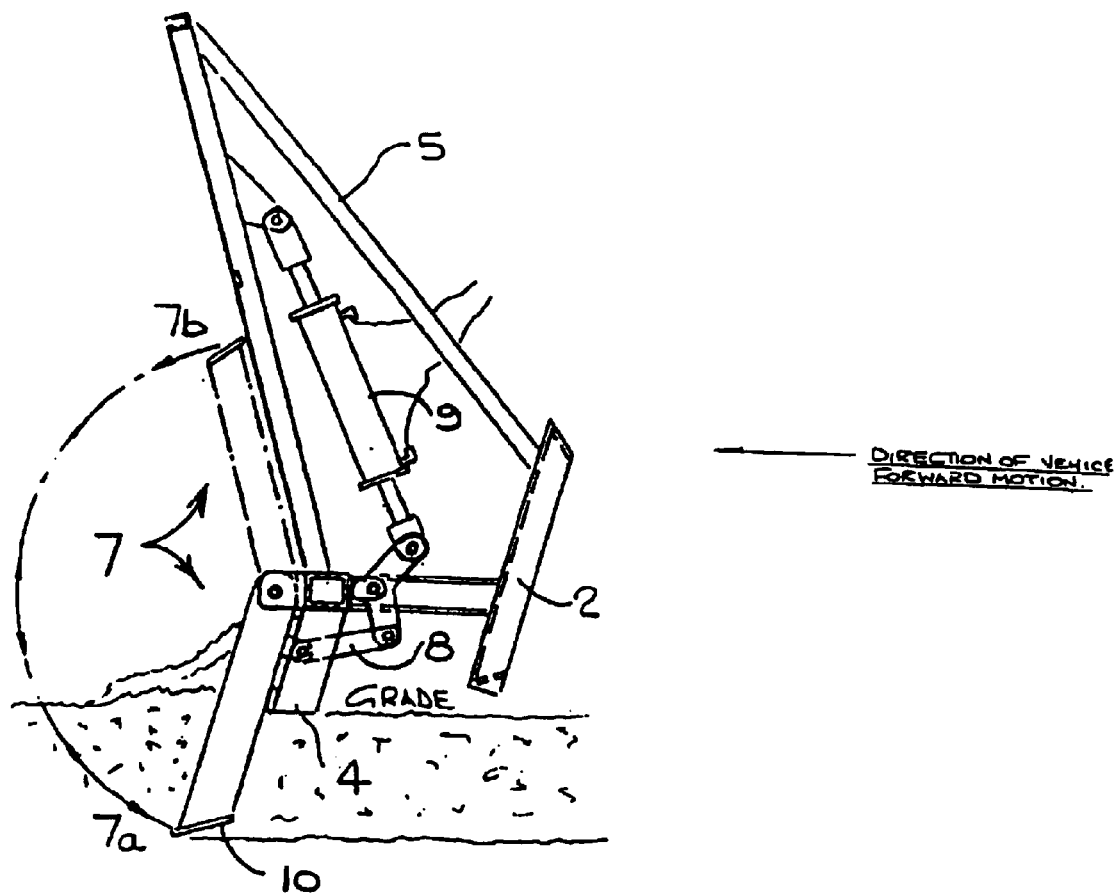
FIG. 4 is a sectional view that shows one configuration of a grubber linkage and a double-acting hydraulic cylinder that together move the grubber through its arcuate range of motion. The grubber is shown in its lower, fully deployed position as solid lines, and in its top, undeployed position as dashed lines.

The embodiment of FIG. 2 illustrates a single grubber in its lowest working position 7a as deployed by linkage 8 and double-acting hydraulic cylinder 9 (see also FIG. 4). The dimensions of linkage 8 can be varied to provide various grubber deployment forces and ranges of motion. Linkage actuation can be provided by means other than hydraulic cylinders, such as electrical or pneumatic solenoids.

The illustrated grubber consists of two parallel blades approximately 22 inches (55.9 cm) apart, a support member connecting the blades near their tops, and a foot 10, being a support member connecting the blades at their bottoms, all of welded sheet steel. When the grubber is in its lowest working position, it is essentially parallel to the lower rake teeth 4, and foot 10 tilts downward in the direction of vehicle forward travel so that its plane forms an acute angle, approximately 41 degrees, with the ground. The leading edge of the grubber foot and the leading edges of approximately nine inches (22.9 cm) of the bottom of the grubber blades are beveled and sharpened to facilitate the cutting of vertical and horizontal roots and debris.

FIG. 4 demonstrates how Applicant's rake and grubber implement operates. With grubber 7 deployed in its lowest working position 7a, the vehicle to which the implement is attached moves in the indicated forward direction. Grubbing commences when the operator lowers the vehicle members to which member 2 is attached, and the 10 of grubber 7 engages the ground. As the operator further lowers the implement, grubber digs deeper into the ground, limited by the depth below grade, if any, to which the operator desires to lower the bottoms of rake teeth 4.

Continued forward motion with grubber below grade level results in plowing and ripping of the ground, severance of roots and debris encountered by the grubber, and disturbance and dislodging of small rocks encountered by the grubber. Roots, debris, and rocks brought to the surface by the grubbing action are then raked to operator-controlled specificity according to the rake teeth 4 height above or depth below grade level.

Further specificity of rake product is provided by the operator-controlled relative position of grubber 7 and rake teeth 4. At any time, even while the vehicle is moving, the operator may actuate cylinder 9 and cause linkage 8 to deploy grubber 7 anywhere in its working arc from position 7a to position 7b. As the grubber moves through its arc, both the horizontal and vertical distances between it and the rake change. At the same time, the operator can raise and lower the entire implement to vary the rake's height above or depth below grade level. These two variables enable the operator to continuously, during operation, select the optimum grubber-rake-ground relationship for the desired results.

The depth and composition of vegetation, rock, or debris to be grubbed is one parameter that dictates the desired design and size of Applicant's invention, as well as the relative position of the rake and grubber during operation. The composition and quantity of rake product is also determinative. If small clumps of vegetation, cactus pads for example, and small rocks are not to be raked, the open-toothed lower rake section of FIG. 2 would suffice. If the rake product includes small plants, debris, and rocks, an operator would prefer a version of the rake with closely spaced teeth, or with the interstitial tooth spaces partially closed or covered.

Quantity and composition of rake product also affects the desired design of the upper rake section. If all grubbed product is to be raked, a completely non-porous design is preferred. If dirt, clods, and small vegetation and rocks that build up on the top of the raked pile are not desired rake product, but large vegetation such as trees is the desired rake product, a porous upper rake is preferred. Also, an angled rake design such as that illustrated in the top view of FIG. 2 offers enhanced containment of rake product. The angled sides (transverse ends) of the rake decrease the amount of rake product that tends to roll off the sides of the rake during forward motion of the work vehicle. If the job calls for mere smoothing of the grubbed product, for example where there are no root, debris, or rocks, an embodiment of Applicant's implement with a closed-tooth lower rake section and no upper rake section may be preferred.

While the present invention has been described in terms of a single preferred embodiment, it will be apparent to those skilled in the art that form and detail modifications may be made to that embodiment without departing from its spirit or scope.

What is claimed is:

1. For attachment to a motorized vehicle, and for provision of continuous and selective raking and grubbing, a combination rake and grubber comprising:
   a rake member releasably and moveably attached to a front portion of the vehicle, the rake member being a solid, substantially vertical wall having a substantially rectangular shape with horizontal top and bottom edges and two transverse ends shorter than and perpendicular to the top and bottom edges;
   one or more grubber members releasably attached to the rake member, the grubber member being rotatable about a first axis; and
   means for rotating the grubber member about the first axis independent of rake member motion.

2. The combination rake and grubber of claim 1 wherein the grubber member is releasably attached to the vehicle.

3. The combination rake and grubber of claim 1 wherein a lower portion of the rake member comprises a plurality of protruding tooth members having interstitial spaces.

4. The combination rake and grubber of claim 3 wherein the tooth members are releasably attached to the lower rake portion.

5. The combination rake and grubber of claim 3 further comprising a means of bridging some or all of the tooth member interstitial spaces.

6. The combination rake and grubber of claim 5 wherein the means of bridging some or all of the tooth member interstitial spaces is releasably attached.

7. The combination rake and grubber of claim 1 wherein an upper portion of the rake member comprises a wall having a plurality of openings.

8. The combination rake and grubber of claim 1 wherein the rake member is constructed with a portion of both transverse ends angled in the direction of work vehicle forward motion an amount effective for enhanced raking.

9. The combination rake and grubber of claim 1 wherein the rake member is comprised of an upper and lower portion forming an angle less than 180 degrees in the direction of the vehicle forward motion.

10. The combination rake and grubber of claim 3 wherein a top portion of the rake member is rotatably attached to the lower portion of the rake member.

11. The combination rake and grubber as in any preceding claim wherein one or more of the grubber members is simultaneously rotatable about the first axis.

12. For attachment to a motorized vehicle, and for provision of continuous and selective raking and grubbing, a combination rake and grubber comprising:
    a rake member releasably and moveably attached to a front portion of the vehicle, the rake member being a substantially vertical mesh wall having a substantially rectangular shape with horizontal top and bottom edges, and two transverse ends shorter than and perpendicular to the top and bottom edges;
    one or more grubber members releasably attached to the rake member, the grubber member being rotatable about a first axis;
    means for rotating the grubber member about the first axis independent of rake member motion;
    a plurality of tooth members and interstitial spaces thereof protruding from a lower portion of the rake member;
    a means of bridging some or all of the tooth member interstitial spaces;
    a portion of both transverse ends of the rake member that are angled in the direction of work vehicle forward motion an amount effective for enhanced raking; and
    an upper and a lower portion of the rake member that form an angle less than 180 degrees in the direction of the vehicle forward motion.

* * * * *